United States Patent Office 2,754,300
Patented July 10, 1956

2,754,300

PRODUCTION OF SUBSTITUTED PYRIDINES

Alexander F. MacLean and Arthur W. Schnizer, Corpus Christi, Tex., assignors to Celanese Corporation of America, New York, N. Y., a corporation of Delaware No Drawing. Application July 24, 1953,
Serial No. 370,219

8 Claims. (Cl. 260—290)

This invention relates to the production of substituted pyridines and relates more particularly to the production of substituted pyridines by the reaction of a methylpyridine with formaldehyde.

The reaction of 2-, 4- or 6-methylpyridines, such as 2-methyl-5-ethylpyridine, with formaldehyde is known in the art. As practiced heretofore, this reaction has been carried out by heating the aforesaid reactants together for an hour or longer in the presence of a catalyst, e. g. a persulfate, benzoyl peroxide or a strong acid, to produce a hydroxyethylpyridine and a vinylpyridine. The reaction may be indicated by the following equation, in which the methylpyridine is 2-methyl-5-ethylpyridine:

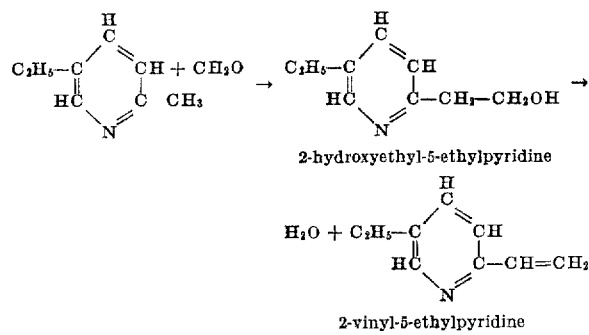

However, in the processes of the prior art the efficiency of the reaction and the degree of conversion have been relatively low.

It is an object of this invention to provide a novel and efficient process for reacting formaldehyde with a methylpyridine wherein conversion to a much higher degree than previously attained is obtained.

Other objects of this invention will appear from the following detailed description and claims.

According to this invention, the methylpyridine and formaldehyde are reacted by a process which comprises heating said methylpyridine to an elevated temperature, e. g. 250° C., and then adding formaldehyde to said heated methylpyridine to react therewith, preferably in the presence of a catalyst, and cooling the resulting mixture. By using the process of the present invention, the reaction may be carried out in a much shorter period of time and the efficiency and the degree of conversion are much higher, as compared with the process of the prior art.

In accordance with one method of practicing this invention, the methylpyridine is mixed with the catalyst, which may be any of the catalysts for this reaction known in the art, e. g. a persulfate salt, a peroxide such as benzoyl peroxide, or a strong acid such as sulfuric or phosphoric acid, the mixture is heated to the reaction temperature, and formaldehyde is injected rapidly with agitation until one mole of formaldehyde has been added per mole of the methylpyridine. Following the injection of the formaldehyde the mixture is cooled rapidly. If desired, the catalyst may be mixed with the formaldehyde instead of with the methylpyridine, or both the formaldehyde and the methylpyridine may contain portions of the catalyst prior to the reaction. The amount of catalyst may be varied widely. For example, when the catalyst is ammonium persulfate, about 0.05 to 2.0 mole percent based on the weight of the formaldhyde may be present.

The formaldehyde may be supplied to the reaction in any suitable form, e. g. as a gas under pressure, as paraformaldehyde, or as a solution of formaldehyde. We have found that best results, e. g. best conversions of the formaldehyde to vinylpyridine, are obtained when the formaldehyde is added in the form of an aqueous solution thereof, more particularly as a 35–40% by weight aqueous solution of formaldehyde. It is preferable to carry out the reaction in the absence of an added solvent, e. g. for simplicity of operation. However, if it is desired, suitable solvents, such as pyridine, quinoline, alcohols or water, may be added.

As stated, the methylpyridine is heated to the reaction temperature before the formaldehyde is added thereto. Thus, the methylpyridine may be heated to a reaction temperature of about 150 to 300° C., preferably 170 to 300° C., although optimum results are obtained at temperatures of about 240° to 260° C., more particularly at about 250° C. It is unnecessary to heat the formaldehyde before it is injected into the heated body of the methylpyridine, since the exothermic heat produced by the reaction maintains the mixture at the desired elevated temperature despite the addition of the relatively cool formaldehyde. Of course the formaldehyde should not not be so cold and the rate of addition thereof so rapid that the temperature of the mixture is reduced below the desired reaction temperature.

Because of the volatility of the formaldehyde at the elevated temperatures of reaction, it is necessary to maintain the reacting mixture under a relatively high pressure, e. g. 400 to 1500 pounds per square inch gauge.

It is desirable to carry out the addition of formaldehyde to the heated methylpyridine rapidly, i. e. within a period of time of no more than about 60 minutes, very superior results being attained when this time period is about 10 to 15 minutes. If the time period for the addition of the formaldehyde is prolonged unduly, a considerable proportion of the vinylpyridine produced by the reaction may be lost, since vinylpyridines tend to polymerize rapidly at the temperature of reaction. This tendency to polymerize may be reduced to some extent by incorporating a polymerization inhibitor, e. g. hydroquinone, t-butylcatechol or trinitrobenzene, into the reaction mixture. On the other hand, optimum results are obtained when the formaldehyde is not injected at an excessively rapid rate, that is, at a rate much greater than the rate at which the formaldehyde reacts with the methylpyridine. If the formaldehyde is added too rapidly, there will be present an excess of unreacted formaldehyde which will tend to decompose at the reaction temperatures. However, if the formaldehyde is added at a rate which is about equal to the rate at which it reacts with the methylpyridine, the ratio of unreacted methylpyridine to formaldehyde in the reaction mixture will be relatively high, so that the formaldehyde will react with the methylpyridine before any appreciable amount of said formaldehyde decomposes.

It is found that optimum results are obtained when the amount of formaldehyde injected into the body of the methylpyridine is about one mole per mole of methylpyridine. However, other proportions may be employed in the reaction, although the results are less desirable. For example, when the amount of formaldehyde is decreased substantially the yield of vinylpyridine is decreased.

As stated, the reaction mixture should be cooled rapidly after the injection of the formaldehyde. As a result of this rapid cooling the undesired reactions, such as polymerization of the vinylpyridine formed in the reaction, are minimized. For best results, it is desirable to cool the mixture to a temperature below 100° C. within a period of no more than about 5 minutes after the injection of the formaldehyde has been completed.

The methylpyridines which may be employed in the present invention are those in which the methyl group is in the 2-, 4- or 6-position in the pyridine ring. It is desirable, of course, to employ methylpyridines whose substituents, if any, do not materially interfere with the course of the reaction. Examples of methylpyridines which may be employed according to the present invention are 2-methylpyridine, 4-methylpyridine, 2-methyl-5-ethylpyridine, and the corresponding 2- or 4-methylquinolines.

The process of the present invention may be carried out batchwise, as in an autoclave, or continuously. When the process is carried out continuously, a stream of a methylpyridine, which may contain the catalyst, is heated to the reaction temperature and then circulated through a reactor, which reactor is advantageously provided with means, such as baffles, to minimize recirculation, or back mixing, therein. Formaldehyde is injected continuously, at the desired rate, into this heated stream of methylpyridine at several spaced points along the path of said stream in the reactor, and the resulting flowing reaction mixture is cooled continuously, in any suitable manner, after the reaction has proceeded in the reactor for the desired period of time.

In order to further illustrate this invention, but without being limited thereto, the following example is given:

*Example*

460 parts by weight (3.80 moles) of 2-methyl-5-ethylpyridine, 3¼ parts by weight (0.014 mole) of ammonium persulfate and 1 part by weight of hydroquinone are charged into an autoclave made of Type 316 stainless steel. The above ingredients, which occupy about 43% of the volume of the autoclave, are then heated to a temperature of 250° C. while the autoclave is closed, following which 326 parts by weight (3.85 moles) of formalin containing 35.4% by weight of formaldehyde are pumped into the autoclave at a uniform rate over a period of 12.5 minutes while the autoclave is rocked to agitate the reactants. During this period the pressure in the autoclave rises to 1050 pounds per square inch gauge. When the injection of formaldehyde is completed, the reaction mixture is cooled to a temperature below 100° C., by immersion of the autoclave in water, over a period of 2 minutes. The resulting mixture contains 288 parts by weight (1.91 moles) of hydroxyethylethylpyridine, 192 parts by weight (1.44 moles) of vinylethylpyridine and 53.2 parts by weight (0.44 mole) of unreacted methylethylpyridine.

It is to be understood that the foregoing detailed description is given merely by way of illustration and that many variations may be made therein within departing from the spirit of our invention.

Having described our invention, what we desire to secure by Letters Patent is:

1. Process for the production of substituted pyridines by the reaction of a pyridine having a methyl substituent with formaldehyde, which comprises separately heating the methyl-substituted pyridine to a temperature of 150 to 400° C., injecting an aqueous solution of formaldehyde into said heated pyridine to react therewith under a pressure of 400 to 1500 pounds per square inch gauge, and cooling the resulting reaction products.

2. Process for the production of substituted pyridines by the reaction of a pyridine selected from the class consisting of pyridines having a methyl substituent in the 2-, 4-, or 6-position, which comprises separately heating the methyl-substituted pyridine to a temperature of 150 to 400° C. in a closed reaction vessel, injecting, over a period of at most 60 minutes, an aqueous solution of formaldehyde into said heated pyridine to react therewith under autogeneous pressure and cooling the resulting reaction products.

3. The process of claim 2 in which the pyridine is 2-methyl-5-ethylpyridine.

4. The process of claim 3 in which the time period is about 10 to 15 minutes.

5. Process for the production of substituted pyridines by the reaction of a pyridine selected from the class consisting of pyridines having a methyl substituent in the 2-, 4-, or 6-position, which comprises separately heating the methyl-substituted pyridine to a temperature of about 240° to 260° C., injecting about one mole of aqueous formaldehyde per mole of said pyridine into said pyridine under a pressure of 400 to 1500 pounds per square inch gauge over a period of about 10 to 15 minutes and in the presence of a catalyst for the reaction of said pyridine and formaldehyde, and then cooling the resulting mixture.

6. Process of claim 5 in which said pyridine is 2-methyl-5-ethylpyridine.

7. Process of claim 5 in which the catalyst is ammonium persulfate in amount of about 0.05 to 2 mole percent based on the formaldehyde.

8. Process for the production of substituted pyridines by the reaction of 2-methyl-5-ethylpyridine with formaldehyde, which comprises separately heating a body of the 2-methyl-5-ethylpridine containing about 0.004 mole of ammonium persulfate per mole of said methylethylpyridine to a temperature of about 250° C., injecting one mole of formalin per mole of said methylethylpyridine into said body under a pressure of 1050 pounds per square inch gauge over a period of about 10 to 15 minutes, and then cooling the resulting mixture to a temperature of less than 100° C. over a period of no more than about 5 minutes.

References Cited in the file of this patent

UNITED STATES PATENTS

| | | |
|---|---|---|
| 2,512,660 | Mahan | June 27, 1950 |
| 2,534,285 | Mahan | Dec. 19, 1950 |
| 2,556,845 | Kauffman | June 12, 1951 |

OTHER REFERENCES

Frank: J. Amer. Chem. Soc., vol. 68, pp. 1368–69, July 1946.

U. S. DEPARTMENT OF COMMERCE
PATENT OFFICE

CERTIFICATE OF CORRECTION

Patent No. 2,754,300                        July 10, 1956

Alexander F. MacLean et al.

It is hereby certified that error appears in the printed specification of the above numbered patent requiring correction and that the said Letters Patent should read as corrected below.

Column 4, line 35, for the claim reference numeral "5" read -- 6 --.

Signed and sealed this 18th day of March 1958.

(SEAL)
Attest:

KARL H. AXLINE
Attesting Officer

ROBERT C. WATSON
Commissioner of Patents